April 8, 1924.  
J. R. TURNER ET AL  
WHEELWRIGHT MACHINE  
Filed Dec. 22, 1921  
1,489,400  
2 Sheets-Sheet 1
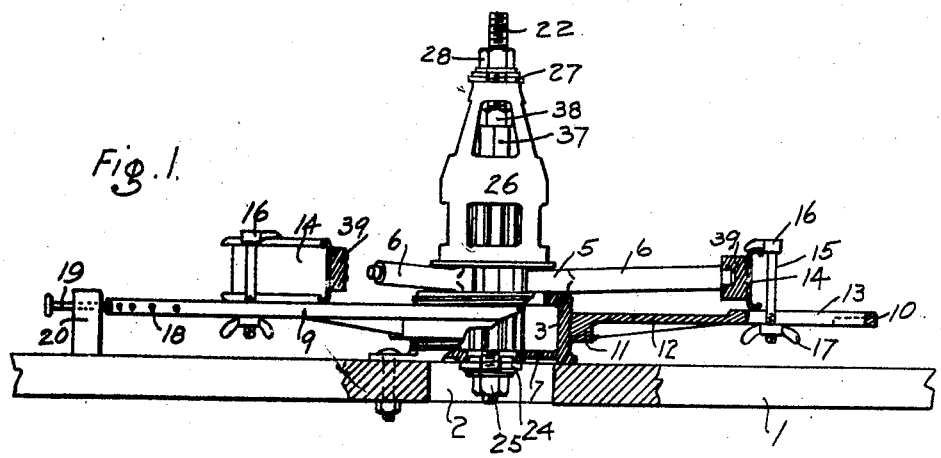
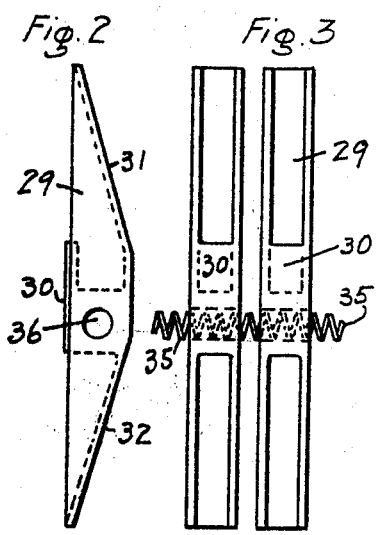
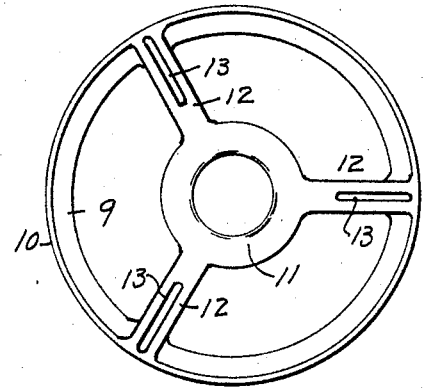
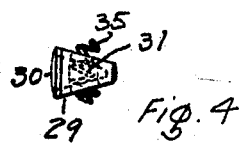
INVENTOR  
Joseph R. Turner  
Thomas W. Thompson  
BY  
ATTORNEY

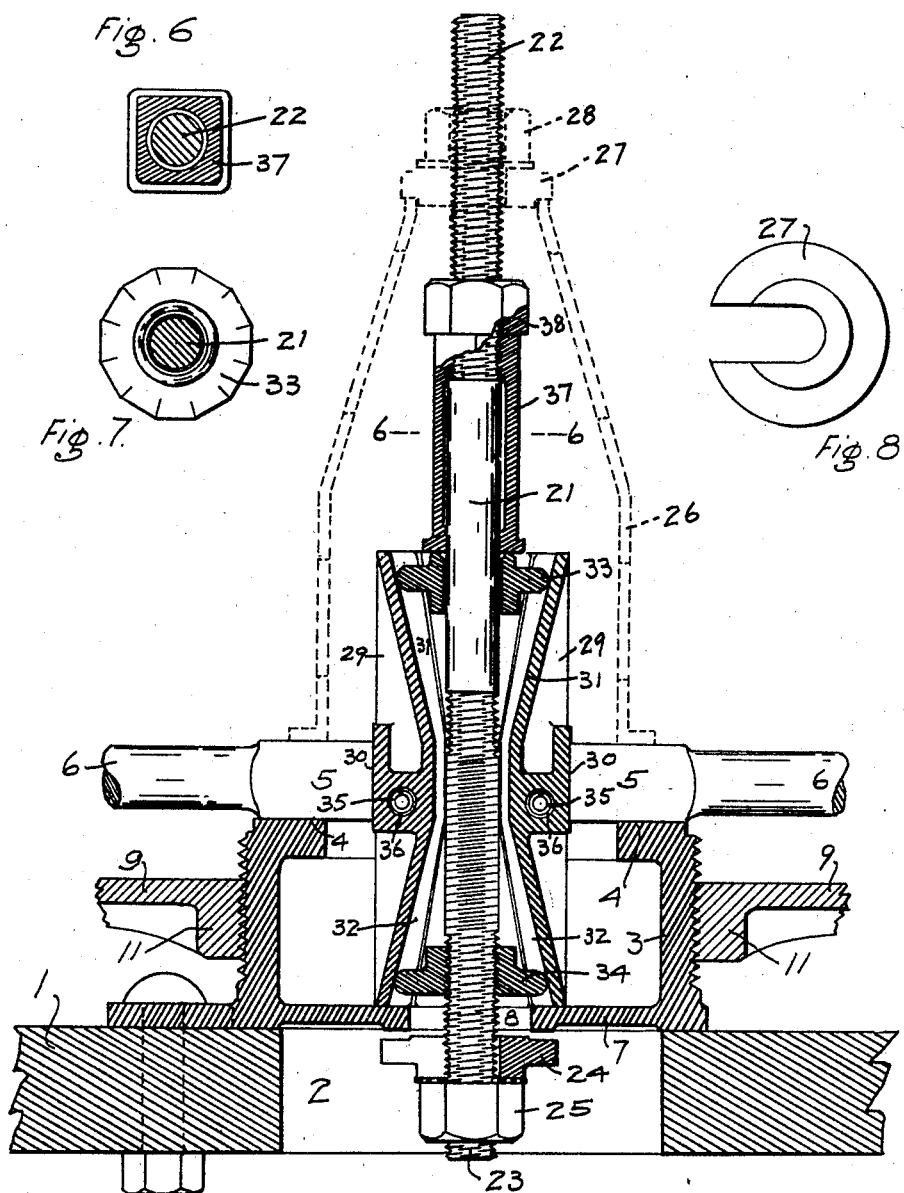

Patented Apr. 8, 1924.

1,489,400

UNITED STATES PATENT OFFICE.

JOSEPH R. TURNER AND THOMAS W. THOMPSON, OF TACOMA, WASHINGTON.

WHEELWRIGHT MACHINE.

Application filed December 22, 1921. Serial No. 524,120.

*To all whom it may concern:*

Be it known that we, JOSEPH R. TURNER and THOMAS W. THOMPSON, citizens of the United States, residing at Tacoma, in the county of Pierce, State of Washington, have invented a new and useful Wheelwright Machine, of which the following is a specification.

Our invention relates to improvements in machines adapted for use in the repair of wheels whose spokes have become loosened from the felly. The objects of this invention are to reduce the cost of manufacture of such a machine; to improve its ease of operation; to provide a machine which is of light weight and therefore portable; which is easily attached to any work bench; in which the anvil is not a part of the adjustable mechanism and therefore receives the force of the hammer blows on a solid base; and in which the action of the spoke pressing mechanism does not move relatively to the spokes and therefore does not crush the upper edges of the inner ends of the spokes.

We attain these and other objects by the devices, mechanisms and arrangements illustrated in the accompanying drawings, in which:—

Fig. 1 is a general elevation of our improved machine, parts being broken away to reveal the interior thereof;

Figs. 2, 3 and 4 are, respectively, side elevation, front elevation, and plan of the wedge blocks;

Fig. 5 is a plan of the wheel table;

Fig. 6 is a section of the screw rod and its turning nut, on the line 6—6 in Fig. 9;

Fig. 7 is a plan of one of the wedge block disks;

Fig. 8 is a plan of one of the slotted washers; and

Fig. 9 is a vertical section of the machine when in use for pressing the spokes outward, the dish forming mechanisms being shown in dotted lines.

Similar numerals of reference refer to similar parts throughout the several views.

Wooden-spoked automobile and other vehicle wheels sometimes become out of repair by the gradual loosening of the outer ends of the spokes in the sockets formed in the wheel felly. Continued use of such a wheel also causes the dish of the wheel to be altered and therefore the wheel becomes weaker and unable to stand the same shocks it could have stood when new or in perfect repair. In order to repair such wheels we remove the rubber tire but leave the metal rim in place and we also remove the two hub plates and bolts; then we first restore the dish and then drive the spokes outward into tight relation with the felly and then tighten the loosened inner ends of the spokes by driving suitable shims between the said spokes at suitable points. The mechanism consists of four main groups:—first the anvil, which forms the base of the machine; second, the adjustable table to which the rim of the wheel is secured and which by its adjustment controls the dish of the wheel; third, the dish pressure mechanism; and fourth, the spoke tightening mechanism.

Referring now to the drawings, the bench 1 may be of any form or size as desired and is provided with a hole 2 therethrough, over the center of which the center of the machine is placed.

The base 3 is secured to the bench 1 in any convenient manner over the hole 2, and consists of a cylindrical body having a screw thread cut in its outer surface and provided with a broadened upper anvil surface 4 on which the inner ends 5 of the spokes 6 rest when the hub plates thereof have been removed. This anvil 4 is therefore at a fixed elevation and the force of the hammer blows on the shims being driven between the inner ends 5 of the spokes, as hereinafter described, will be transmitted direct to the bench 1 without passing through any of the adjustable mechanism. A web 7 is formed across the lower end of the base 3 and is provided with a central hole 8 therethrough. The web 7 is horizontal and is adapted to loosely support the lower ends of the wedge blocks, as shown in Fig. 9.

The wheel table 9 consists of a circular rim 10, a central boss 11 having a screw-threaded hole at the center and adapted to screw up and down on the screw-threaded base 3, and a plurality of arms 12 joining the rim 10 to the boss 11. Each of the arms 12 is provided with a radial slot 13 and is adapted to support the rim 14 of the wheel being repaired. The wheel is secured to the table 9 by means of clamp bolts 15 which pass up through the slots 13 in the arms 12 and which are provided with suitable heads 16, adapted to engage the wheel rim 14 and with winged nuts 17 by which the rim is clamped to the table 9. It is evident that when the table 9 is turned on the base 3 its elevation will be changed relatively to the anvil 4 so that when the inner ends 5 of the spokes 6 are forced down on the anvil 4 they will be given a certain dish, and that by such rotation of the table this dish can be made any required amount. We provide a series of holes 18 in the outer edge of the rim 10. A pin 19, suitably supported in a lug 20 fixed to the bench 1, is arranged to enter any one of said holes 18 to hold the table 9 in such adjusted position.

A central rod 21 is screw-threaded at each end, as at 22 and 23, but is not threaded at its center. This rod carries the disks by which the wedge blocks and spokes are forced outward, as will be described later. It also carries a slotted washer 24 and a nut 25 at its lower end 23, and said washer engages the lower surface of the web 7 and the rod 21 passes through the hole 8 in the web. The rod is held from falling downward through the hole 8 by the hereinafter described spoke pressing mechanism.

A hollow cone 26 is passed over the upper end of the rod 21 and rests on the upper surface of the inner ends 5 of the spokes 6. A second slotted washer 27 is slipped over the rod 21 and engages the upper end of the cone 26, and a nut 28 is screwed on the upper end 22 of the rod. By screwing this nut 28 down on to the washer 27 the rod 21 pulls upward against the washer 24 and the spoke ends 5 are pressed into tight contact with the anvil 4 so that the desired dish is given to the wheel. The above parts, the washers 24 and 27, cone 26, and the nuts 25 and 28 are used only in connection with making the desired dish in the wheel and when such has been obtained, the nuts 25 and 28 are loosened and the washers 24 and 27 and the cone 26 are removed from the machine.

Referring particularly to Figs. 2, 3, 4 and 5 it will be seen that a plurality of spoke wedge blocks 29 are provided, one for each spoke 6 of the wheel, and that each such wedge block is provided with a vertical part 30, adapted to engage the inner end 5 of the spoke to push it outward, and with two oppositely inclined wedge surfaces 31 and 32 adapted to be engaged by the hereinafter described disks 33 and 34 respectively. All the wedge blocks are flexibly secured together by means of a spiral spring 35 threaded through suitable holes 36 in the said blocks and having its two opposite ends secured together in any desired manner. The bundle of wedge blocks thus formed, is placed within the hub space between the inner ends 5 of the spokes 6 with the lower ends of the wedge blocks resting on the upper surface of the web 7. As above mentioned the rod 21 is not threaded at its central part, and this may be of square or hexagonal section, if desired, in order to provide a surface which can be engaged by a suitable wrench whereby the rod may be turned on its axis; but we prefer, and have shown in Fig. 9 a square or hexagonal nut and sleeve 37 which is screwed down on the threads 22 and is jambed down to the end of said threads and then a lock nut 38 is screwed tightly down on it, thus making a fixed connection between the sleeve 37 and the rod 21 so that when the sleeve is turned by a suitable wrench the rod turns with it.

An upper wedge block disk 33 is loosely mounted on the rod 21 below the lower end of the sleeve 37 and is pressed downward thereby but does not rotate therewith. The outer edge of this disk is polygonal in plan, one side being provided for each wedge block in the bundle. The disk 33 engages the upper wedge surface 31 of each of the wedge blocks 29 and presses the said wedges outward as it moves downward therebetween. The lower wedge block disk 34 is of similar form to the disk 33 but is screwed on to the lower part 23 of the rod 21 and does not turn therewith but, as the rod 21 is turned to screw downward, the disk 34 screws upward thereon. Thus it will be seen that when the rod 21 is turned in a "right hand" direction the disks 33 and 34 are drawn towards each other and therefore the wedge blocks 29 are forced apart and outward. As before stated each wedge block engages the inner end 5 of one of the spokes 6 of the wheel and therefore as they are thus pushed outward they force the spokes 6 into the wheel felly 39, thus correcting the looseness thereof. The parts are left in this position while shims are being driven between the adjacent surfaces of the inner ends 5 of the spokes 6, said inner ends having become loosened from each other by the outward radial motion into the felly 39. Thus they are tightened again in the hub, and when so tightened the mechanism can be released by unscrewing the rod 21, thus separating the disks 33 and 34 and contracting the set of wedge blocks 29 so that they and the rod 21 may be lifted out of the machine, and then the rim 14 may be released from the clamps 16 and removed from the table.

It is evident that, in the operation of our machine the spokes are pressed directly outward without any scraping thereon or without damage in the inner corners thereof, and that when the shims are being driven between the spoke ends the force of the hammer blows is received directly on the solidly supported anvil surface 4.

Having described our invention, what we claim is:—

1. In a wheelwright machine, the combination of a frame for supporting the rim of a wheel; a series of outwardly movable blocks, each engaging the inner end of a spoke of the wheel and each having an inclined wedge surface facing the central axis of the wheel; and means movable along the axis of the wheel and engaging said inclined wedge surfaces whereby all said blocks are equally forced radially away from the axis of the wheel and the spokes are forced into tight relation with the felly.

2. In a wheelwright machine, the combination of a frame for supporting the rim of a wheel; a series of outwardly movable blocks, each engaging the inner end of a spoke of the wheel and each having two oppositely inclined wedge surfaces all facing the central axis of the wheel; and two complementary means equally and oppositely movable along the axis of the wheel and each engaging one of said inclined wedge surfaces of each of said blocks, whereby all said blocks are equally forced radially away from the axis of the wheel and the spokes are forced into tight relation with the felly.

3. In a wheelwright machine, the combination of a frame for supporting the rim of a wheel; a series of blocks, each engaging the inner end of a spoke of the wheel and having oppositely inclined wedge surfaces all facing the central axis of the wheel; a connection between said blocks whereby they are attached together in a set but are permitted limited free movement against the action of said connection; and two disks equally and oppositely movable along the axis of the wheel and engaging said wedge surfaces, whereby the blocks are forced radially apart and the spokes of the wheel are forced into tight relation with the wheel felly.

JOSEPH R. TURNER.
THOMAS W. THOMPSON.